United States Patent
Pan et al.

(10) Patent No.: US 8,235,560 B2
(45) Date of Patent: Aug. 7, 2012

(54) BACKLIGHT MODULE

(75) Inventors: Bor-Jyh Pan, Hsinchu (TW); Yi-Wen Lin, Hsinchu (TW)

(73) Assignee: Young Lighting Technology Inc., Hsinchu (TW)

( * ) Notice: Subject to any disclaimer, the term of this patent is extended or adjusted under 35 U.S.C. 154(b) by 465 days.

(21) Appl. No.: 12/106,458

(22) Filed: Apr. 21, 2008

(65) Prior Publication Data

US 2009/0154174 A1    Jun. 18, 2009

(30) Foreign Application Priority Data

Dec. 13, 2007 (TW) ................. 96147610 A (51) Int. Cl.
*F21V 29/00* (2006.01)
*F21V 7/20* (2006.01)
*B60Q 1/06* (2006.01)
*G09F 13/04* (2006.01)
*G09F 13/08* (2006.01)

(52) U.S. Cl. ........ 362/373; 362/218; 362/294; 362/97.1
(58) Field of Classification Search .................. 362/218, 362/373, 294, 97.1–97.4
See application file for complete search history.

(56) References Cited

U.S. PATENT DOCUMENTS

| | | | | |
|---|---|---|---|---|
| 5,686,790 A * | 11/1997 | Curtin et al. | ................. | 313/493 |
| 6,089,739 A * | 7/2000 | Yamamoto et al. | ........... | 362/561 |
| 6,154,362 A * | 11/2000 | Takahashi et al. | ............ | 361/695 |
| 7,157,838 B2 * | 1/2007 | Thielemans et al. | ............ | 313/35 |
| 7,230,659 B2 * | 6/2007 | Ha et al. | .......................... | 349/58 |
| 7,438,450 B2 * | 10/2008 | Aoki et al. | .................... | 362/373 |
| 7,455,421 B2 * | 11/2008 | Suzuki | .......................... | 362/221 |
| 7,651,249 B2 * | 1/2010 | Ohashi et al. | ................. | 362/373 |
| 7,663,730 B2 * | 2/2010 | Shibata | ......................... | 349/161 |
| 7,852,427 B2 * | 12/2010 | Lin | ................................ | 349/58 |
| 7,954,968 B2 * | 6/2011 | Takata et al. | ................. | 362/97.1 |
| 2004/0032725 A1 * | 2/2004 | Hsieh et al. | ..................... | 362/31 |
| 2005/0073639 A1 * | 4/2005 | Pan | ................................ | 349/161 |
| 2006/0072344 A1 * | 4/2006 | Kim et al. | ..................... | 362/632 |

FOREIGN PATENT DOCUMENTS

| TW | 590235 | 6/2004 |
|---|---|---|
| TW | 594272 | 6/2004 |
| TW | I251459 | 3/2006 |
| TW | I263088 | 10/2006 |
| TW | I276391 | 3/2007 |

OTHER PUBLICATIONS

Taiwan office action dated Feb. 21, 2012 and its English language translation.

* cited by examiner

*Primary Examiner* — Jong-Suk (James) Lee
*Assistant Examiner* — David J Makiya
(74) *Attorney, Agent, or Firm* — Thomas|Kayden (57) ABSTRACT

A backlight module includes a panel, a base, at least a light-emitting element, a heat-dissipating board and at least a circuit board. The base is connected to the panel to form an accommodating space. The light-emitting element is disposed in the accommodating space. The heat-dissipating board is disposed on the base and connected to the base. The heat-dissipating board includes at least two connecting portions and a top portion. The connecting portions are respectively connected to two ends of the top portion and the base to separate the top portion from the base for forming a heat-dissipating space therebetween. The circuit board is disposed on an outer surface of the top portion far away from the base.

11 Claims, 10 Drawing Sheets

BACKLIGHT MODULE

BACKGROUND OF THE INVENTION

1. Field of the Invention

The invention relates to a backlight module, and more particularly to a backlight module which improves heat-dissipating efficiency.

2. Description of the Related Art

Figure 1:
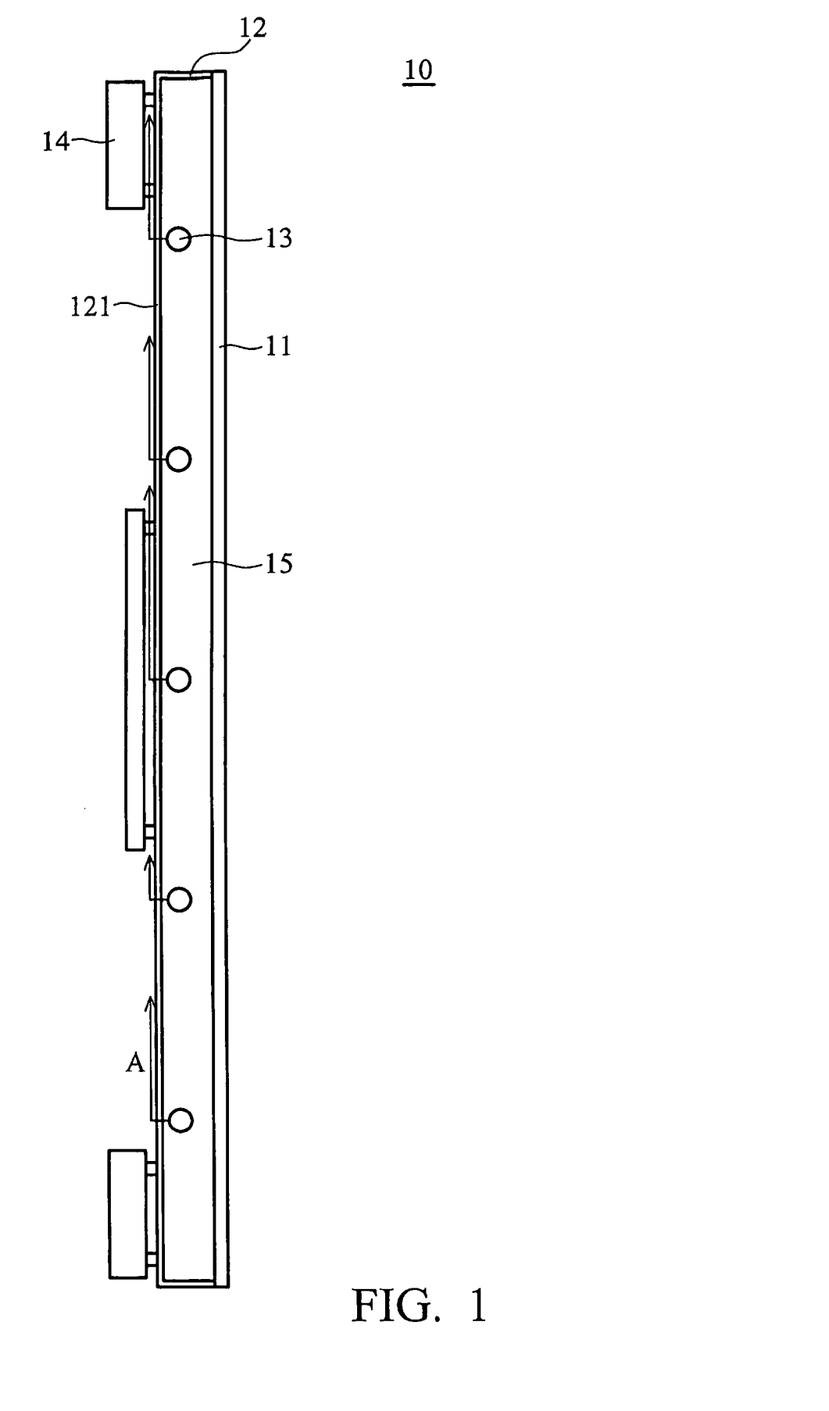
FIG. 1 is a schematic view of a conventional backlight module.

Referring to FIG. 1, FIG. 1 is a schematic view of a conventional backlight module. The conventional backlight module 10 includes a panel 11, a base 12, a light-emitting element 13, and a plurality of circuit boards 14. The base 12 and the panel 11 form an accommodating space 15. The light-emitting element 13 is installed in the accommodating space 15. The base 12 comprises an outer surface 121. The circuit boards 14 are installed on the outer surface 121 of the base 12. Usually, the backlight module 10 is applied to a display. When using the display, the backlight module 10 is set upright, as shown in FIG. 1. Heat generated by the light-emitting element 13 is dissipated from the accommodating space 15 to the outside of the backlight module 10 via the outer surface 121 of the base 12. Because of convection, air with higher temperature moves upward (along an arrow A). When heat from the backlight module 10 is dissipated via convection, air with higher temperature is blocked via the circuit boards 14. Thus, the backlight module 10 can not dissipate heat successfully and quickly and provide greater heat-dissipating efficiency. Because of circuit boards 14 blockage, heat may be partially stored in the backlight module 10, decreasing light-emitting element 13 efficiency, backlight module 10 vividness, brightness uniformity and operating lifespan.

BRIEF SUMMARY OF THE INVENTION

The invention provides a backlight module improving heat dissipation via convection, and further improving backlight module vividness, brightness uniformity and operating lifespan.

Other objectives and advantages of the invention are shown in preferred embodiments of the invention.

To reach one, partial or all objectives, one embodiment of the invention provides a backlight module. The backlight module includes a panel, a base, at least a light-emitting element, a heat-dissipating board and at least a circuit board. The base is connected to the panel to form an accommodating space. The light-emitting element is installed in the accommodating space. The heat-dissipating board is disposed on the base and connected to the base. The heat-dissipating board includes at least two connecting portions and a top portion. The connecting portions are respectively connected to two ends of the top portion and the base to separate the base from the top portion and to form a heat-dissipating space. The circuit board is disposed on an outer surface of the top portion far away from the base.

To improve heat-dissipating efficiency of the backlight module, another embodiment of the backlight module further includes a heat-dissipating element, and the heat-dissipating element is installed between the base and the heat-dissipating board. The heat-dissipating board may be a heat sink, and the heat sink includes a plate installed on the base and a plurality of sheets connected to the plate.

Furthermore, an embodiment of the backlight module further includes a fan, the fan is disposed on the outer surface of the top portion of the heat-dissipating board, and the fan includes an outlet toward the heat-dissipating space to guide an airflow to the heat-dissipating space.

In the embodiments of the invention, the backlight module includes a heat-dissipating board between the base and the circuit boards to form a heat-dissipating space. When using the backlight, heat generated by the light-emitting element is dissipated by the heat-dissipating space formed by heat-dissipating board, thus, heat is efficiently dissipated via convection. As improving the heat-dissipating via convection, backlight module vividness, brightness uniformity and operating lifespan are improved. Further, the heat sink dissipates heat with high temperature generated by the light-emitting element via conduction, improving the heat-dissipating efficiency. Moreover, the backlight module includes the fan to improve the convection efficiency in the backlight module.

Other objectives, features and advantages of the present invention will be further understood from the further technological features disclosed by the embodiments of the present invention, wherein there are shown and described preferred embodiments of this invention, simply by way of illustration of modes best suited to carry out the invention.

BRIEF DESCRIPTION OF DRAWINGS

The invention can be more fully understood by reading the subsequent detailed description and examples with references made to the accompanying drawings, wherein:

FIG. 8 is

DETAILED DESCRIPTION OF THE INVENTION

In the following detailed description of the preferred embodiments, reference is made to the accompanying drawings which form a part hereof, and in which are shown by way of illustration of specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component faces "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
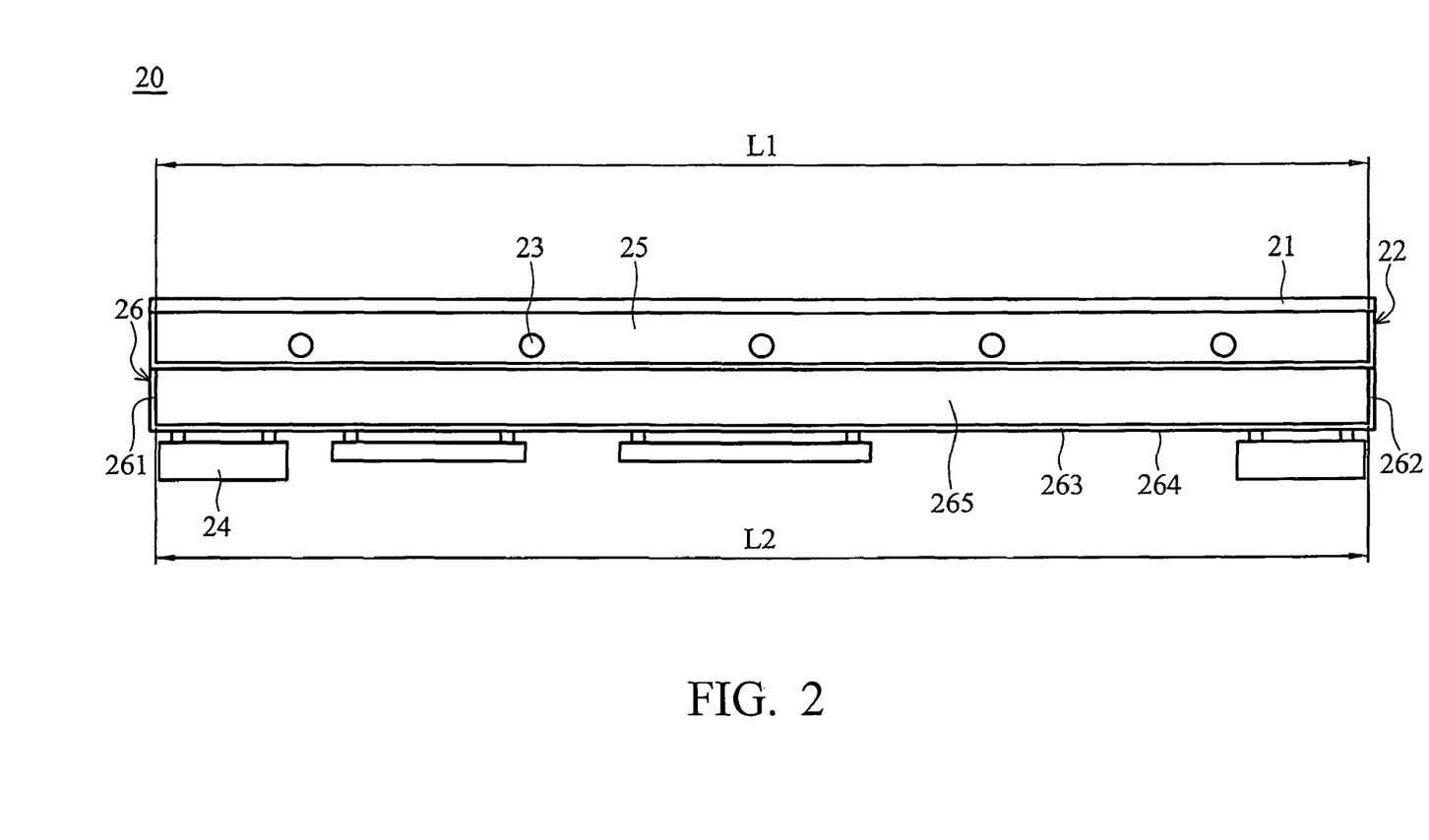
FIG. 2 is a schematic view of an embodiment of a backlight module of the invention.

Referring to FIG. 2, FIG. 2 is a schematic view of an embodiment of a backlight module 10 of the invention. The backlight module 20 includes a panel 21, a base 22, a light-emitting element 23, a circuit board 24 and a heat-dissipating board 26. The base 22 is connected to the panel 21 to form an accommodating space 25. The light-emitting element 23 is installed in the accommodating space 25. The heat-dissipating board 26 is disposed on the base and connected to the base 22. The heat-dissipating board 26 is U-shaped and includes at least two connecting portions 261, 262 and a top portion 263. The connecting portions 261, 262 are respectively connected to two ends of the top portion 263 and the base 22 to separate the base 22 from the top portion 263 and to form a heat-dissipating space 265. The circuit board 24 is disposed on an outer surface 264 of the top portion 263 far away from the base 22. An interval L2 exists between the connecting portions 261, 262. A length L1 exists between two opposite sides of the base 22. The length L1 and interval L2 face the same direction. The interval L2 is equal to the length L1.

Figure 3:
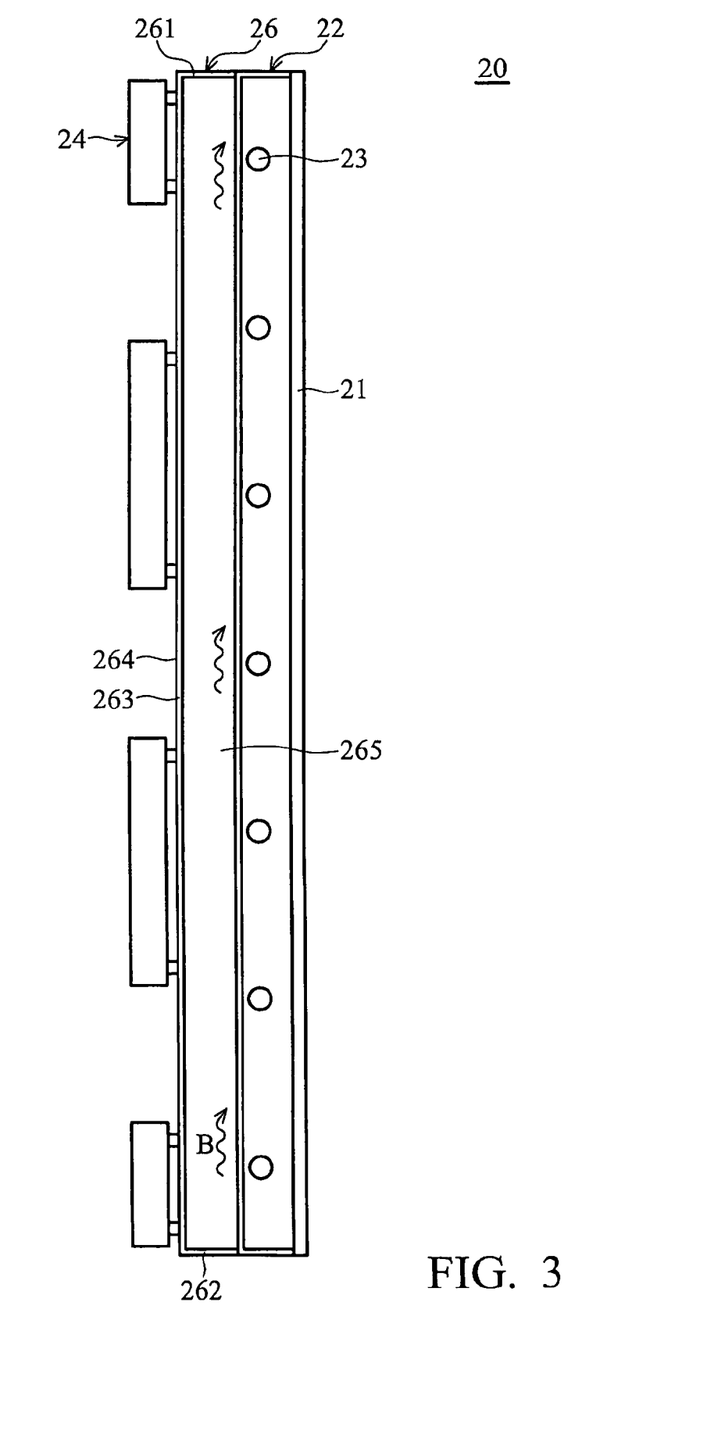
FIG. 3 is a schematic view showing an embodiment of a backlight module of the invention applied in a display.

Referring to FIG. 3, FIG. 3 is a schematic view showing another embodiment of a backlight module 20 of the invention applied in a display. Usually, the backlight module 20 is applied in a display (not shown). When using the display, the backlight module 200 is set upright (shown in FIG. 3). Heat generated by the light-emitting element 23 passes through the base 22 and is dissipated from the accommodating space 25 to the heat-dissipating space 265 of the heat-dissipating board 26. Because of convection, air with higher temperature moves upward (along an arrow B). The backlight includes the heat-dissipating board 26 to form the heat-dissipating space 265 and allows the circuit board 24 to be connected to the outer surface 264 of the heat-dissipating board 26. The backlight module 20 dissipating heat via convection may avoid that air with high temperature is blocked by the circuit board 14 of the conventional backlight module 10 (shown in FIG. 1), thus, the backlight module 20 may dissipate heat successfully and quickly. Heat generated by the light-emitting element 23 is dissipated to the heat-dissipating space 265 of the heat-dissipating board 26 in the backlight module 20 without any element that blocks air with high temperature to convect, and then air with high temperature flows upward (along the arrow B). Thus, heat in the backlight module 20 is successfully and quickly dissipated, avoiding heat to be partially stored, which decreases the efficiency of the light-emitting element 23. Further, backlight module vividness, brightness uniformity and operating lifespan are improved.

Figure 4:
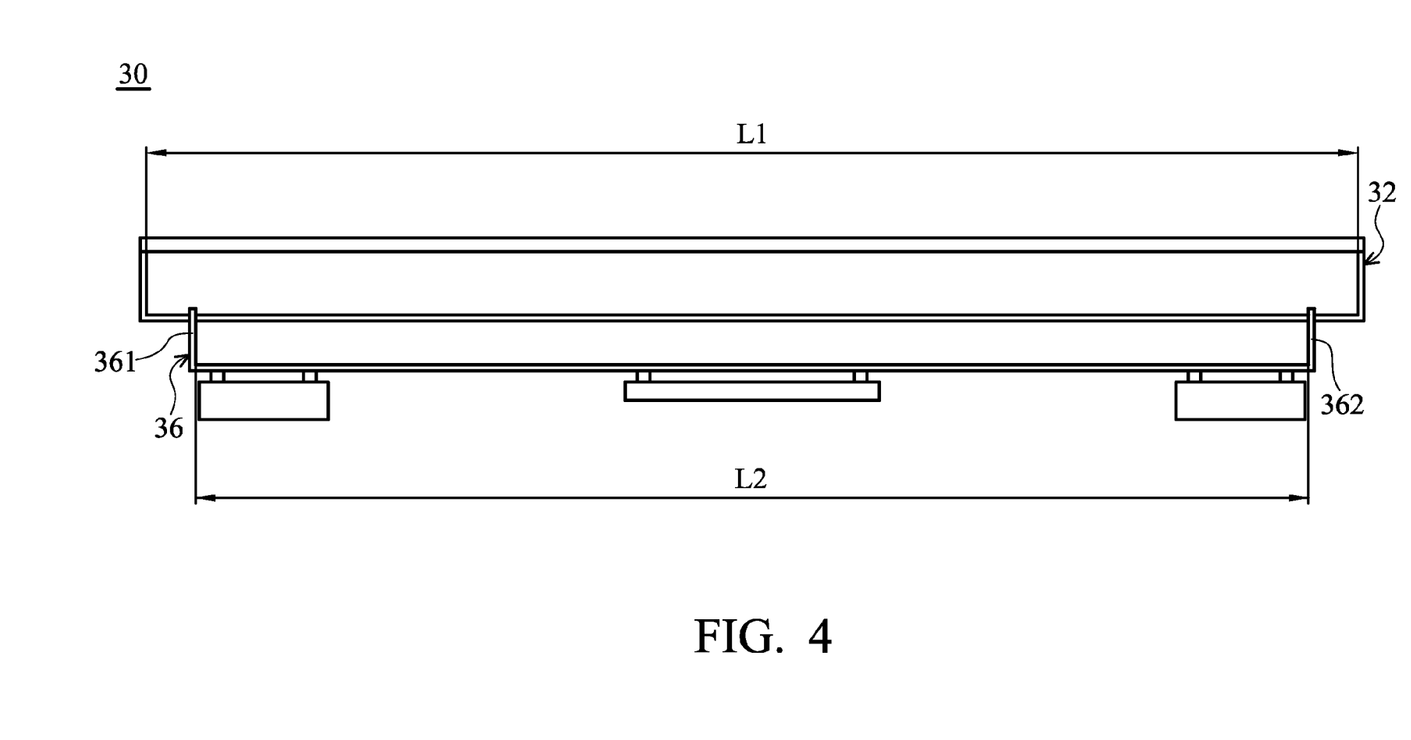
FIG. 4 is a schematic view of another embodiment of a backlight module of the invention.

Referring FIG. 4, FIG. 4 is a schematic view of another embodiment of a backlight module 30 of the invention. The structure of the backlight module 30 is approximately similar to that of the backlight module 20 in FIG. 2. The difference is the relationship between the length L1 of the base 32 and the interval L2 between the connecting portions 361, 362 of the heat-dissipating board 36. In this embodiment, the interval L2 is less than the length L1, namely, the heat-dissipating board 36 does not completely cover the base 32.

Figure 5:
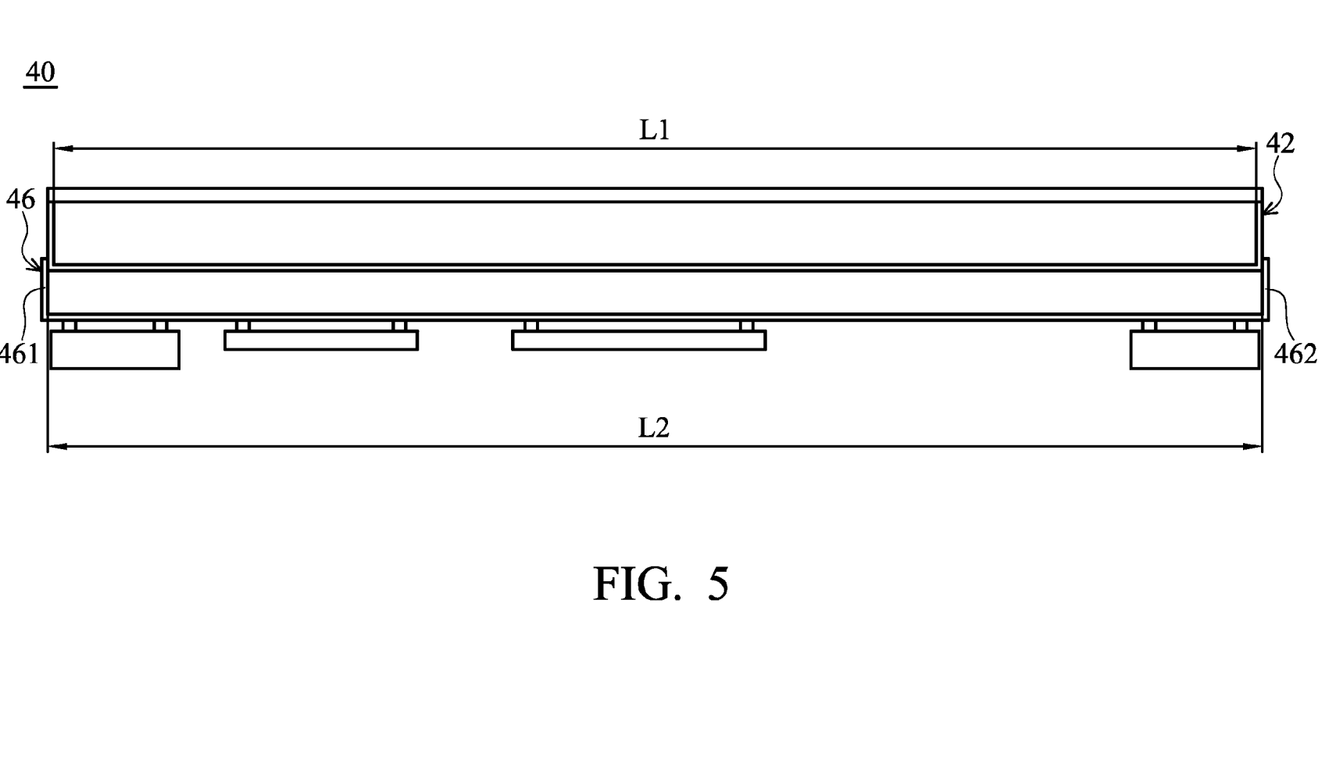
FIG. 5 is a schematic view of another embodiment of a backlight module of the invention.

Referring FIG. 5, FIG. 5 is a schematic view of another embodiment of a backlight module 40 of the invention. The structure of the backlight module 40 is approximately similar to that of the backlight module 20 in FIG. 2. The difference is the relationship between the length L1 of the base 42 and the interval L2 between the connecting portions 461 and 462 of the heat-dissipating board 46. In this embodiment, the interval L2 is greater than the length L1, namely, the heat-dissipating board 46 completely covers the base 42.

Figure 6:
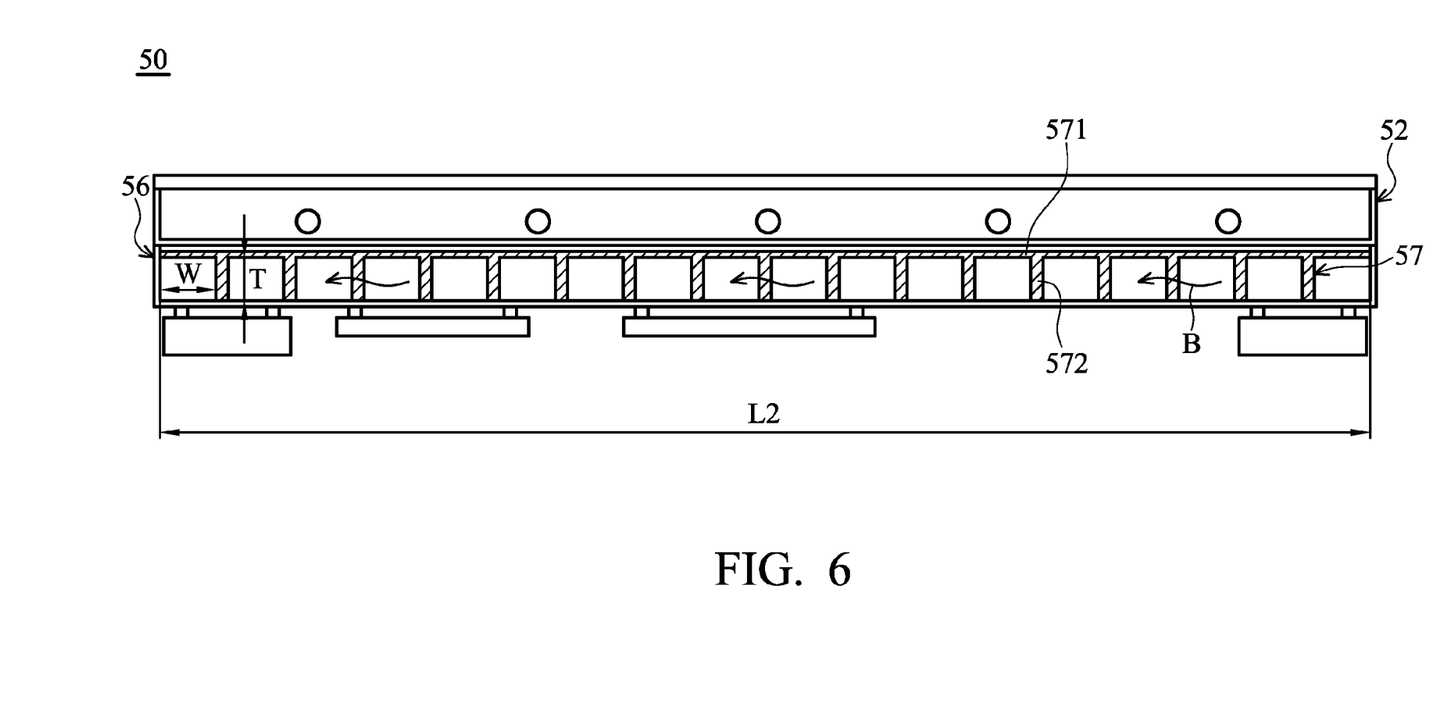
FIG. 6 is a schematic view of another embodiment of a backlight module of the invention.

Referring FIG. 6, FIG. 6 is a schematic view of another embodiment of a backlight module 50 of the invention. The structure of the backlight module 50 is approximately similar to that of the backlight module 20 in FIG. 2. The difference is that the embodiment of the backlight module of the invention further includes a heat-dissipating element 57 disposed between the base 52 and the heat-dissipating board 56. In this embodiment, the heat-dissipating element 57 is a heat sink 57. The heat sink 57 includes a plate 571 installed on the base 52 and a plurality of sheets 572 connected to the plate 571. The heat sink 57 is installed between the base 52 and the heat-dissipating board 56. To provide air with high temperature to smoothly pass through the heat sink 57, thus efficiently dissipating heat from the backlight module 50, the size of the dissipating space of the heat-dissipating board 56 is redesigned. In this embodiment, the preferred size of the heat-dissipating board 56 is disclosed as follows. A width W exists between two adjacent sheets 572. A thickness T exists between the plate 571 of the heat sink 57 and the heat-dissipating board 56. A length L1 exists between two sides of the base 42. The ratio of the width W, the thickness T and the length L1 are calculated by laminar flow boundary layer of Blasius. H. The length L1 and the arrangement of the sheets 572 face the same direction. The relationship between the δ (thickness of the boundary layer) and x (the flowing distance) is shown as following:

$$\delta = \frac{4.95}{Re_x^{1/2}} x \quad \text{(formula 1)}$$

$Re_x$ is Reynold number of laminar flow. $Re_x < 5*10^5$ is substituted into formula 1. δ>0.007x (formula 2) is calculated. When the thickness T (between the plate 571 of the heat sink 57 and the heat-dissipating board 56)>2δ (double boundary layer) and x (flowing distance)=L1 (the height of the backlight module), T>0.014L1 (formula 3) is calculated.

When width W (between two adjacent sheets 572 of the heat sink 57)>2δ (double boundary layer), W>0.014L1 (formula 4) is calculated.

For example, a 32 inch backlight module, the height L1=430 mm is substituted into T>0.014L1 (formula 3) and W>0.014L1 (formula 4). T>6.02 mm, W>6.02 mm are calculated.

Figure 7:
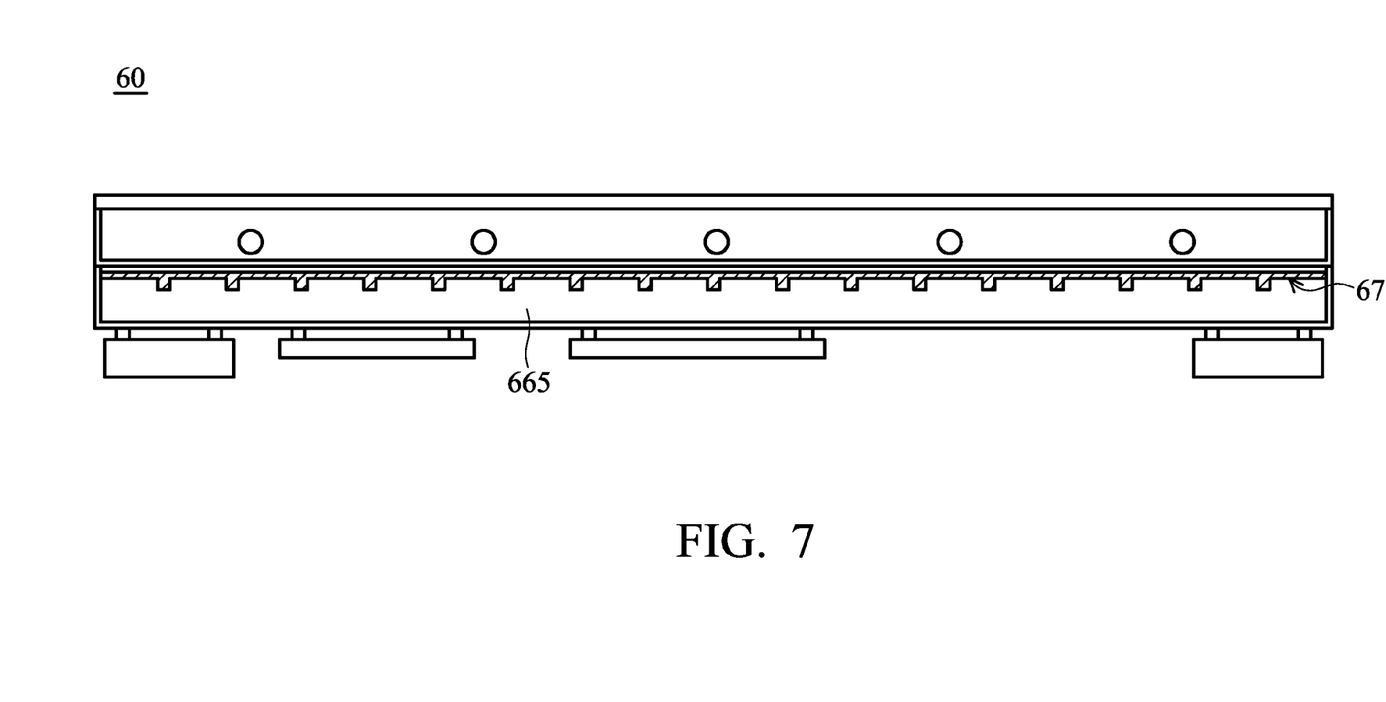
FIG. 7 is a schematic view of another embodiment of a backlight module of the invention.

Referring to FIG. 7, FIG. 7 is a schematic view of another embodiment of a backlight module 60 of the invention. The structure of the backlight module 60 is approximately similar to that of the backlight module 50 in FIG. 6. The difference is the length of sheets of the heat sink 67 in the heat-dissipating space 665 of the backlight module 60 is less than that in FIG. 6.

Figure 8:
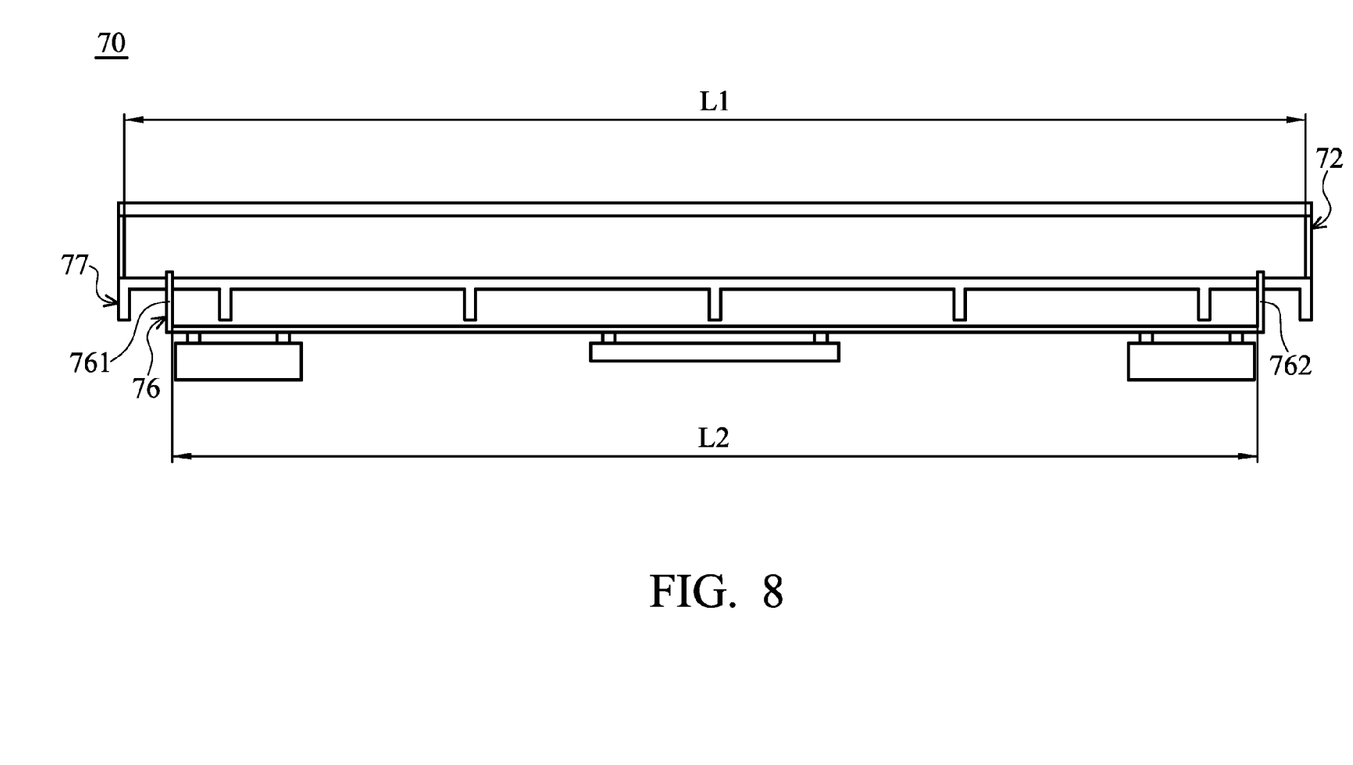
FIG. 8 is a schematic view of another embodiment of a backlight module of the invention.
Figure 9:
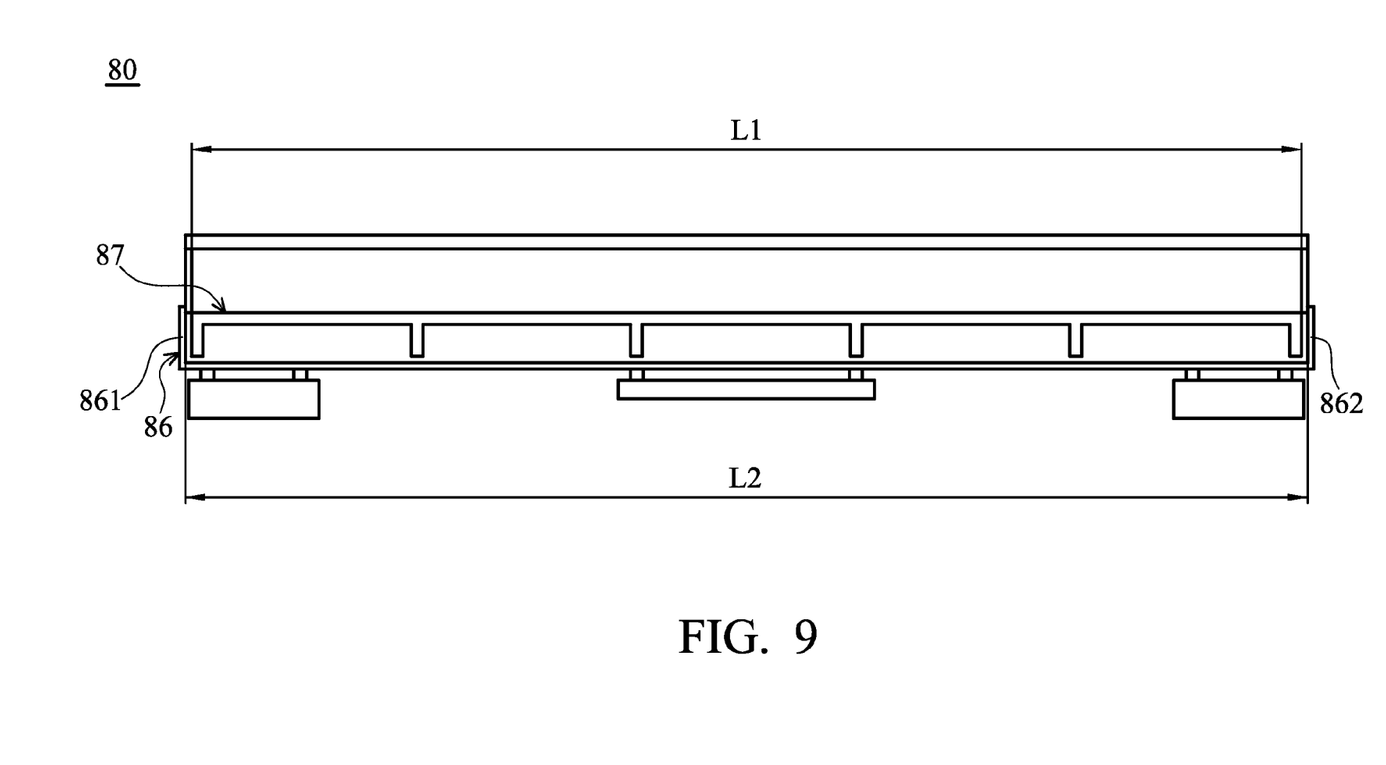
FIG. 9 is a schematic view of another embodiment of a backlight module of the invention.

Referring to FIGS. 8 and 9, FIG. 8 is a schematic view of another embodiment of a backlight module 70 of the invention and FIG. 9 is a schematic view of another embodiment of a backlight module 80 of the invention. The structure of the backlight modules 70 and 80 are approximately similar to that of the backlight module 50 in FIG. 6. The backlight modules 70 and 80 include heat sinks 77 and 87, too. The difference between FIGS. 6 and 8 is the relationship between the length L1 of the base 72 and interval L2 between the connecting portions 761 and 762 of the heat-dissipating board 76. In this embodiment, the interval L2 is less then the length L1. Thus, the heat-dissipating board 76 does not completely cover the base 72.

The difference between FIGS. 6 and 9 is the relationship between the length L1 of the base 82 and interval L2 between the connecting portions 861, 862 of the heat-dissipating board 86. In this embodiment, the interval L2 is greater then the length L1. Thus, the heat-dissipating board 86 completely covers the base 82.

Figure 10:
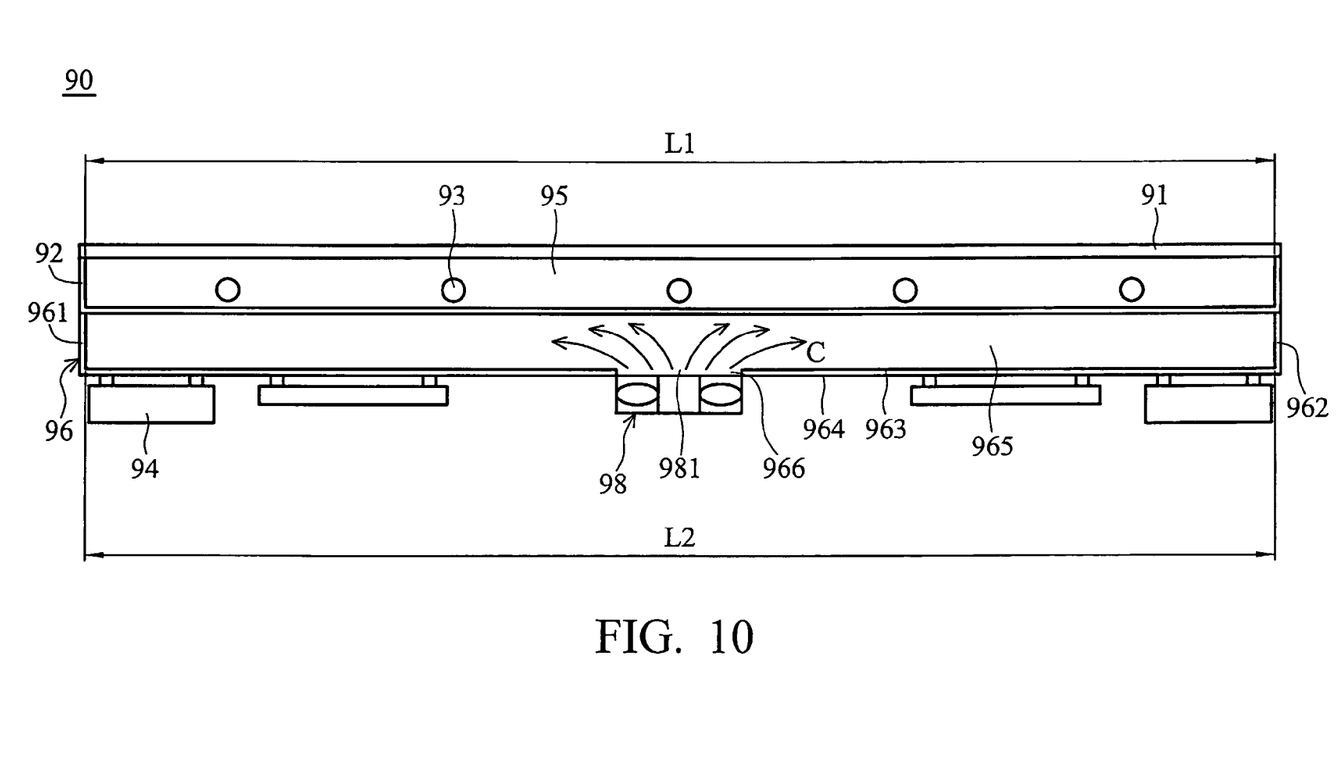
FIG. 10 is a schematic view of another embodiment of a backlight module of the invention.

Referring to FIG. 10, FIG. 10 is a schematic view of another embodiment of a backlight module 90 of the invention. The backlight module 90 includes a panel 91, a base 92, a light-emitting element 93, a circuit board 94, a heat-dissipating board 96 and a fan 98. The base 92 is connected to the panel 91 to form an accommodating space 95. The light-emitting element 93 is installed in the accommodating space 95. The heat-dissipating board 96 is disposed on the base 92 and connected to the base 92. The heat-dissipating board 96 includes at least two connecting portions 961 and 962 and a top portion 963. The top portion 936 includes an opening 966 to accommodate the fan 98. The connecting portions 961, 962 are respectively connected to two ends of the top portion 963 and the base 92 to separate the base 92 from the top portion 963 and to form a heat-dissipating space 965. The circuit board 94 is disposed on an outer surface 964 of the top portion 963 far away from the base 92. An interval L2 exists between the connecting portions 961, 962. The base 22 includes a length L1. In this embodiment, the interval L2 is equal to the length L1. The fan 98 is installed on the outer surface 964 of the top portion 963 of the heat-dissipating board 96 and includes an outlet 981 toward the heat-dissipating space 965 to guide an airflow to the heat-dissipating space 965 (along an arrow C) for cooling the backlight module 90.

By adding a heat-dissipating board between the base and the circuit board in the backlight module, a heat-dissipating space is formed. When using the backlight module, heat generated by the light-emitting element may be efficiently dissipated via convection. After improving heat-dissipating efficiency, backlight module vividness, brightness uniformity and operating lifespan are improved. Further, the heat sink provides heat generated by the light-emitting element to be dissipated via conduction for enhancing heat-dissipating efficiency. Moreover, adding a fan in the backlight module improves convection efficiency.

The foregoing descriptions of the preferred embodiments of the invention has been presented for purposes of illustration and description. It is not intended to be exhaustive or to limit the invention to a precise form or to an exemplary embodiments disclosed. Accordingly, the foregoing description should be regarded as illustrative rather than restrictive. Obviously, many modifications and variations will be apparent to practitioners skilled in the art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
    a panel;
    a base, connected to the panel to form an accommodating space, wherein the base has a sheet part;
    at least one light-emitting element, installed in the accommodating space;
    a heat-dissipating board, disposed on the base and connected to the base, comprising at least two connecting portions and a top portion, wherein the connecting portions are respectively connected to two ends of the top portion and the base to separate the base from the top portion and to form a heat-dissipating space; and
    at least one circuit board, disposed on an outer surface of the top portion far away from the base, wherein the base, the heat-dissipating board, and the heat-dissipating space are located between the at least one circuit board and the at least one light-emitting element, wherein a surface of the at least one circuit board is not exposed to the heat-dissipating space, wherein there is a space between the top portion and the at least one circuit board, wherein the base separates the at least one light-emitting element from the at least one circuit board, and wherein the at least one light-emitting element and the at least one circuit board are respectively located on opposite sides of the base.

2. The backlight module as claimed in claim 1, wherein the heat-dissipating board is U-shaped.

3. The backlight module as claimed in claim 1, wherein the connecting portions of the heat-dissipating board are separated by an interval, two opposite sides of the base are separated by a length, the length and the interval face the same direction, and the interval is equal to the length.

4. The backlight module as claimed in claim 1, wherein the connecting portions of the heat-dissipating board are separated by an interval, two opposite sides of the base are separated by a length, the length and the interval face the same direction, and the interval is less than the length.

5. The backlight module as claimed in claim 1, wherein the connecting portions of the heat-dissipating board are separated by an interval, two opposite sides of the base are separated by a length, the length and the interval face the same direction, and the interval is greater than the length.

6. The backlight module claimed in claim 1, further comprising a heat-dissipating element installed between the base and the heat-dissipating board.

7. The backlight module claimed in claim 6, wherein the heat-dissipating element comprises a heat sink, and the heat sink comprises a plate installed on the base and a plurality of sheets connected to the plate.

8. The backlight module claimed in claim 7, wherein the plate and the heat-dissipating board are separated by a thickness T, two opposite sides of the base are separated by a length L1, the length L1 and the arrangement of the sheets face the same direction, and T>0.014L1.

9. The backlight module claimed in claim 7, wherein the two adjacent sheets are separated by a width W, two opposite sides of the base are separated by a length L1, the length L1 and the arrangement of the sheets face the same direction, and W>0.014L1.

10. The backlight module claimed in claim 1, further comprising a fan disposed on the outer surface of the top portion of the heat-dissipating board, wherein the fan comprises an outlet toward the heat-dissipating space to guide an airflow to the heat-dissipating space.

11. The backlight module claimed in claim 1, wherein the heat-dissipating space is an empty space.

* * * * *